(12) United States Patent
Naoe et al.

(10) Patent No.: US 7,269,355 B2
(45) Date of Patent: Sep. 11, 2007

(54) OPTICAL SPACE COMMUNICATIONS DEVICE AND CONTROL METHOD THEREOF

(75) Inventors: Hitoshi Naoe, Kitakatsuragi-gun (JP); Shohei Osawa, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 536 days.

(21) Appl. No.: 10/851,403

(22) Filed: May 24, 2004

(65) Prior Publication Data

US 2004/0240885 A1 Dec. 2, 2004

(30) Foreign Application Priority Data

May 30, 2003 (JP) ............................. 2003-155743

(51) Int. Cl.
*H04B 10/24* (2006.01)
*H04B 10/00* (2006.01)

(52) U.S. Cl. .................. 398/118; 398/41; 398/128; 398/130; 398/138

(58) Field of Classification Search ............... 398/118, 398/119, 128, 129, 130, 131, 140, 151, 156, 398/158, 9, 16, 22, 25, 33, 41–44, 75–78, 398/135, 138
See application file for complete search history.

(56) References Cited

U.S. PATENT DOCUMENTS

2002/0018492 A1* 2/2002 Sakai et al. ................. 370/512

FOREIGN PATENT DOCUMENTS

| CA | 2166255 A1 | 6/1997 |
|---|---|---|
| EP | 1148679 A2 | 10/2001 |
| JP | 64-64423 A | 3/1989 |
| JP | 4-35109 U | 3/1992 |
| JP | 9-200134 A | 7/1997 |
| JP | 9-233026 A | 9/1997 |
| JP | 10-126343 A | 5/1998 |
| JP | 11-168435 A | 6/1999 |
| JP | 11-196048 A | 7/1999 |
| JP | 11-234207 A | 8/1999 |
| JP | 11-239107 A | 8/1999 |
| JP | 2000-244409 A | 9/2000 |
| JP | 2000-357997 A | 12/2000 |
| JP | 3137167 B2 | 12/2000 |
| JP | 2001-292195 A | 10/2001 |

OTHER PUBLICATIONS

English abstract of JP 2001-308995 A, Nov. 2, 2001.
English abstract of JP 2002-84247 A, Mar. 22, 2002.
English abstract of JP 9200152 A.

* cited by examiner

*Primary Examiner*—M. R. Sedighian
(74) *Attorney, Agent, or Firm*—Birch, Stewart, Kolasch & Birch, LLP (57) ABSTRACT

An optical space communications device includes a transmitter circuit which assigns an idle code indicating that the device is transmitting no data so that the idle code differs from an idle code for another device and which, when the transmitter circuit continuously transmits such idle codes, inserts, between the idle codes, a random code having a different random pattern from a pattern of the idle codes. Thus, light from another device is distinguished from stray light based on the idle codes. A disconnection of the other device is reliably detected. The insertion of random codes reduces effect of crosstalk jitter.

20 Claims, 3 Drawing Sheets

OPTICAL SPACE COMMUNICATIONS DEVICE AND CONTROL METHOD THEREOF

This Nonprovisional application claims priority under 35 U.S.C. § 119(a) on Patent Application No. 2003-155743 filed in Japan on May 30, 2003, the entire contents of which are hereby incorporated by reference.

FIELD OF THE INVENTION

The present invention relates to an optical space communications device and method for space transmission using light.

BACKGROUND OF THE INVENTION

Research and development is under way for a simple high-speed/broadband communications technology.

A simple technique for wireless device-to-device communications is space communications involving, for example, radio waves (FRO communications) or light (optical space communications).

Many optical space communications techniques are usually implemented based on IrDA (Infrared Data Association) standards, ASK, and other schemes.

In these schemes, half-duplex communications, or a time-division based communications, are performed. Specifically, while one of two nodes is engaged in communications, the other node only receives a signal, transmitting no signal. When the communications stop, the nodes switch their transmission/reception roles.

However, every time the nodes switch their transmission/reception roles, half-duplex communications require a signal-absent period to free a receiver amplifier from overloading due to self-emitted light acting on the amplifier's optical reception capability. After that period, (i) a period for optical receiving components to become stable and (ii) a period to time output a preamble for synchronization of the CDR (Clock Data Recovery) for receiver circuitry to the signal must elapse before transmitting a start bit or synchronization signal. These wasted, non-communications periods reduce effective communications speed even at high data rates.

Accordingly, for efficient use of bandwidth, full duplex can be employed whereby both nodes can continuously engage in communications with each other.

However, optical full-duplex wireless communications have a problem that a node undesirably receives light transmitted by itself. This makes the technology extremely difficult in practice. A solution for light-based full-duplex wireless communications is given by conventional art. Details follow.

Patent documents 1 to 3 disclose use of differing wavelengths.

Patent documents 4 to 6 disclose electrical canceling of that part of outgoing signals which interferes with incoming signals.

Patent documents 7 to 10 disclose separating of optical axes by means of an optical system or block wall.

Patent documents 11 to 13 disclose application of properties of polarized light.

The following patent documents 1 to 16 show conventional art related to this application.

[Patent Document 1]
Japanese published unexamined patent application 64-64423 (Tokukaisho 64-64423/1989; published on Mar. 10, 1989)

[Patent Document 2]
Japanese published unexamined patent application 9-200152 (Tokukaihei 9-200152/1997; published on Jul. 31, 1997)

[Patent Document 3]
Japanese published unexamined patent application 11-196048 (Tokukaihei 11-196048/1999; published on Jul. 21, 1999)

[Patent Document 4]
Japanese published unexamined patent application 8-56198 (Tokukaihei 8-56198/1996; published on Feb. 27, 1996). An equivalent to Japanese patent 3137167.

[Patent Document 5]
Japanese published unexamined patent application 11-168435 (Tokukaihei 11-168435/1999; published on Jun. 22, 1999)

[Patent Document 6]
Japanese published unexamined patent application 8-56198 (Tokukaihei 8-56198/1996; published on Feb. 27, 1996)

[Patent Document 7]
Japanese published unexamined patent application 9-233026 (Tokukaihei 9-233026/1997; published on Sep. 5, 1997)

[Patent Document 8]
Japanese published unexamined patent application 11-234207 (Tokukaihei 11-234207/1999; published on Aug. 27, 1999)

[Patent Document 9]
Japanese published unexamined patent application 2000-244409 (Tokukai 2000-244409; published on Sep. 8, 2000)

[Patent Document 10]
Japanese published unexamined patent application 9-200134 (Tokukaihei 9-200134/1997; published on Jul. 31, 1997)

[Patent Document 11]
Japanese published unexamined patent application 11-239107 (Tokukaihei 11-239107/1999; published on Aug. 31, 1999)

[Patent Document 12]
Japanese published unexamined patent application 2000-357997 (Tokukai 2000-357997; published on Dec. 26, 2000)

[Patent Document 13]
Japanese published unexamined patent application 10-126343 (Tokukaihei 10-126343/1998; published on May 15, 1998)

[Patent Document 14]
Japanese published unexamined patent application 2001-292195 (Tokukai 2001-292195; published on Oct. 19, 2001)

[Patent Document 15]
Japanese published unexamined patent application 2001-308955 (Tokukai 2001-308955; published on Nov. 2, 2001)

[Patent Document 16]
Japanese published unexamined patent application 2002-84247 (Tokukai 2002-84247; published on Mar. 22, 2002)

[Patent Document 17]

Japanese published unexamined utility model application 4-35109 (Tokukai 4-35109/1992; published on Mar. 24, 1992)

However, conventional arrangements give rise to following problems.

In cases of differing wavelengths being used, two devices involved in communications may be designed to use respective wavelengths for transmission if they are paired up in advance. However, if there is no advance pairing, the devices need to be designed so that they are both capable of sending and receiving two different wavelengths. The need for such design adds to the cost of optical systems.

In cases of electrical canceling of unwanted interference of outgoing signals, signals from the transmitter circuitry are fed back to the receiver circuitry in an analog manner to cancel predicted interference signals from the transmitter circuit. The cancellation requires accurate prediction of return light which in turn necessitates provision of an optical system or an analog feedback circuit. These requirements add to the cost of the communications device.

In cases of separating of optical axes by means of an optical system or block wall, full duplex is achieved by, for example, narrowing beams with a lens so that the beams hit only the receiving end or separating outgoing light from incoming light. These processes require adjustment of the two axes or matching of angles and positions. Therefore, in these cases, either a separate optical system must be installed at an additional cost or the devices must be secured at a fixed angle and positions relative to each other.

In cases of application of properties of polarized light, polarizers are provided, one before the light source and another before the receiving section, so that the receiving section receives only the light from the other device through the polarizer. Light intensity drops when the light passes through the polarizer. In addition, the devices, to utilize polarized light, must be installed at a specific relative angle.

SUMMARY OF THE INVENTION

The present invention provides an optical space communications device and control method capable of full-duplex space communications using light at equal wavelengths in simple form.

An optical space communications device in accordance with embodiments of the present invention is an optical space communications device for full-duplex optical space communications with light at equal wavelengths, and characterized in that the device includes a transmitter circuit which assigns an idle code indicating that the device is transmitting no data so that the idle code differs from an idle code for another device and which, when the transmitter circuit continuously transmits such idle codes, inserts, between the idle codes, a random code having a different random pattern from a pattern of the idle codes.

A method of controlling an optical space communications device in accordance with embodiments of the present invention is a method of controlling an optical space communications device for full-duplex optical space communications with light at equal wavelengths, and characterized in that the method comprises:

assigning an idle code indicating that the device is transmitting no data so that the idle code differs from an idle code for another device; and when continuously transmitting such idle codes, inserting, between the idle codes, a random code having a different random pattern from a pattern of the idle codes.

According to the structure and method, the idle code differs from one device to another, making it possible to distinguish another device's light from stray light. A disconnection of the other device is reliably detected. For example, when the device has received a code which the other device never transmits, the device regards the code as indicating that the other device has disconnected and carries out a disconnection if the code is an idle code the device may transmit.

In addition, the insertion of a random code reduces effect from crosstalk jitter even when idle codes are continuously transmitted. Therefore, signal transitions and sampling point margins are reduced. As a result, CDR circuits for signal sampling can be manufactured at low cost.

Hence, the optical space communications device performs full-duplex space communications with light at equal wavelengths in simple form.

For a fuller understanding of the nature and advantages of the invention, reference should be made to the ensuing detailed description taken in conjunction with the accompanying drawings.

DESCRIPTION OF THE EMBODIMENTS

Figure 1:
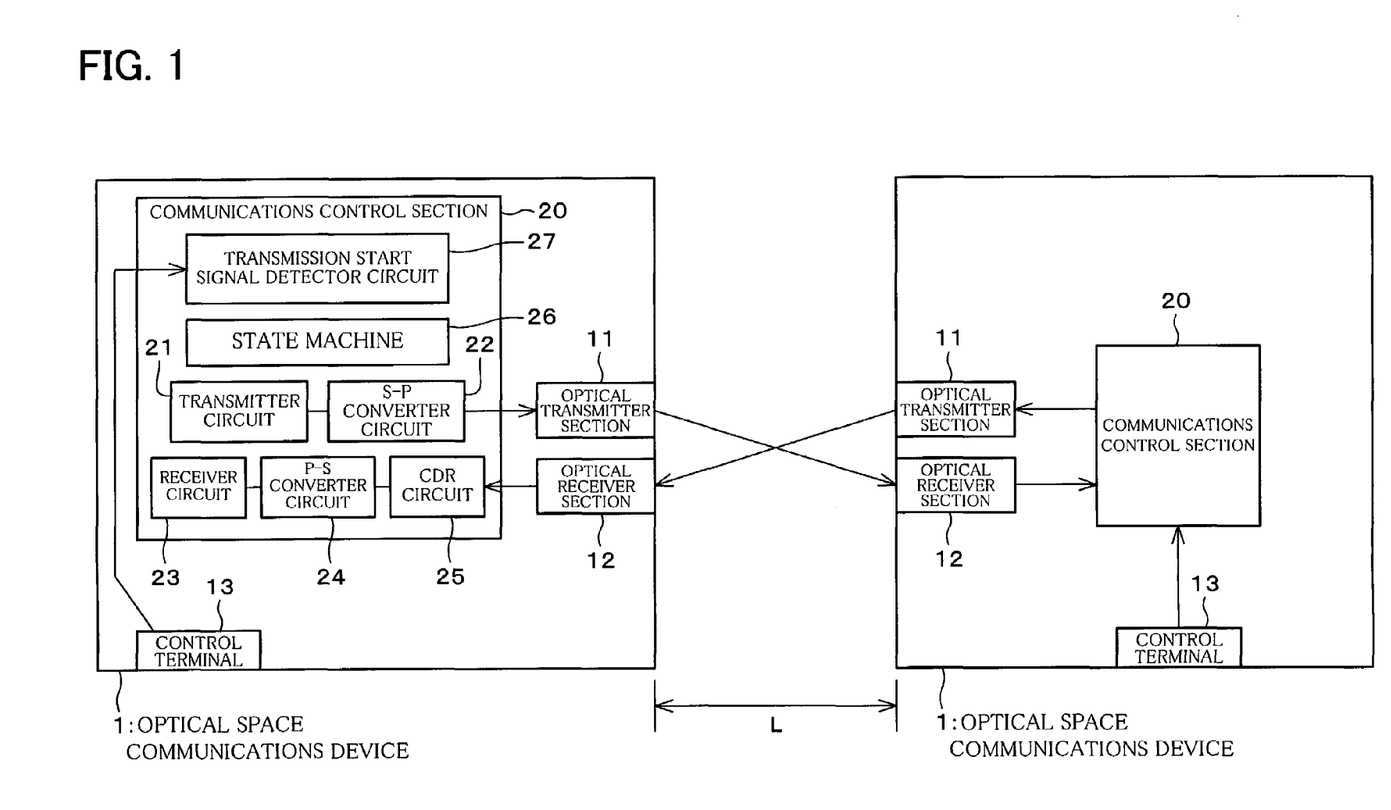
FIG. 1 is a schematic function block diagram showing a structure of an optical space communications device in accordance with an embodiment of the present invention.
Figure 2:
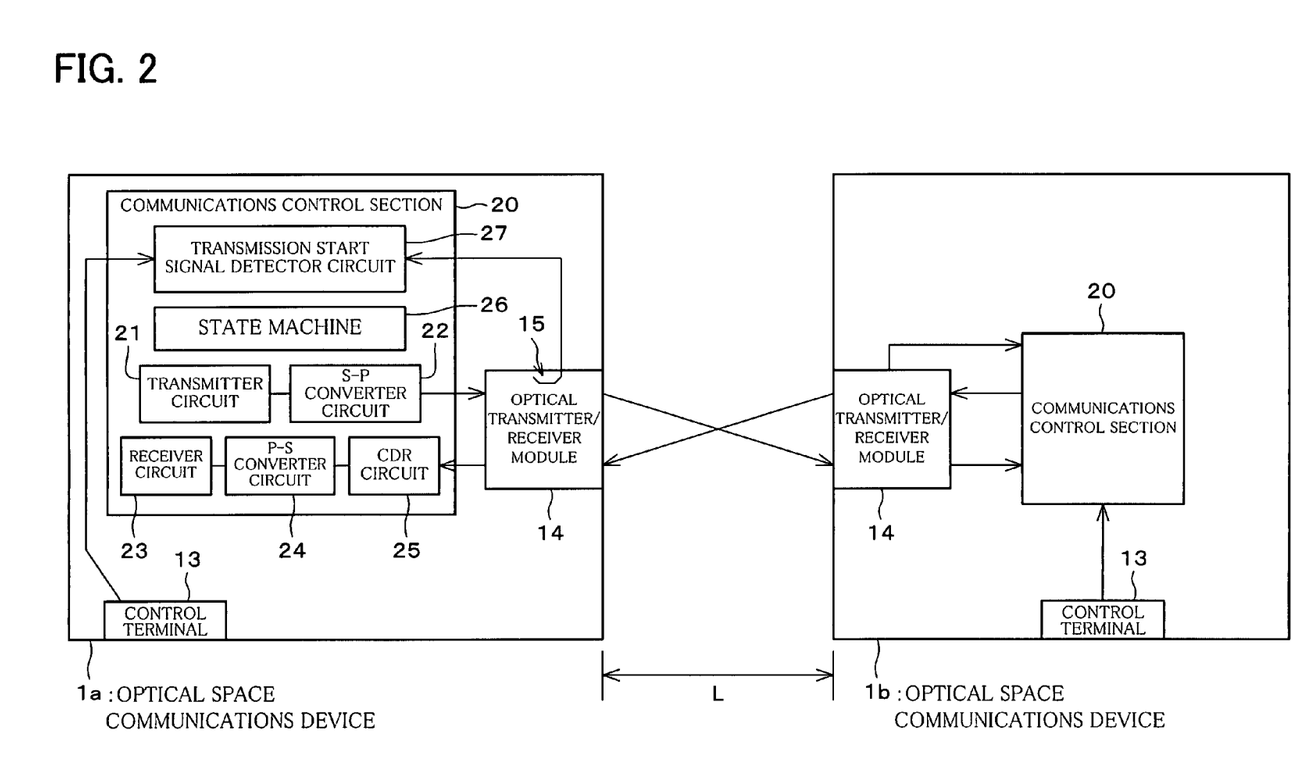
FIG. 2 is a schematic function block diagram showing another structure of an optical space communications device in accordance with an embodiment of the present invention.
Figure 3:
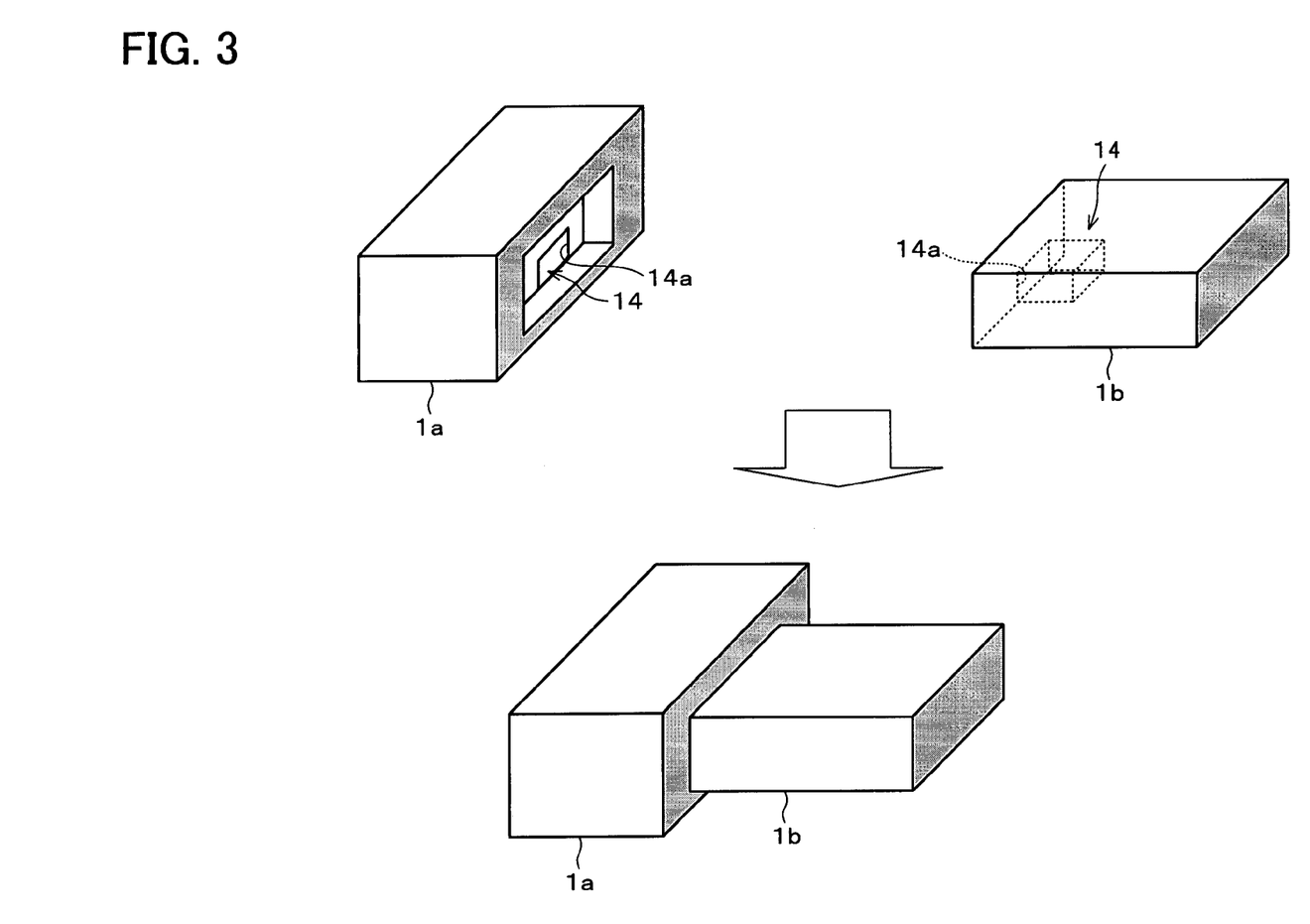
FIG. 3 is a an explanatory drawing showing the optical space communications device in FIG. 2 during communications.

The following will discuss embodiments of the present invention in reference to FIGS. 1 to 3.

FIG. 1 is a schematic function block diagram for an optical space communications device (optical wireless communications device) 1. The optical space communications device 1 performs full-duplex space communications at one wavelength. To this end, the optical space communications device 1 includes a communications control section 20, an optical transmitter section 11, an optical receiver section 12, and a control terminal (trigger obtaining means, trigger generating means) 13.

In typical optical communications, the following four states occur. In the optical space communications device 1, a state machine 26 implements control in accordance with the state.

(i) Standby. The device (first device) 1 neither transmits light nor detects a second device.

(ii) Connection verification. The first device transmits light to search for the second device. Upon reception of light from the second device, the first device switches to connection state. The devices involved exchange signals other than the ones used for data transmission (hereinafter, "tone signals") to detect a connection to the second device. After the detection, the devices exchange dummy signals with each other. The dummy signals are of the same frequency and modulated in the same manner as those which will carry data and control information. By the exchange of the dummy signals, the two devices stabilize an optical module and the CDR of a control IC and specify a transfer rate, establishing a connection between them. Specifically, the devices exchange predetermined codes to establish a character synchronization. If a connection immediately follows the tone exchange, the optical module and CDR may not operate correctly; signals are therefore exchanged which are modulated in the same manner as in connection state for a certain period of time, and character synchronization is performed simultaneously.

(iii) Connection. The devices are now ready for data communications. Following the establishment of a connection between the devices, a data transmission is started. Specifically, an ordinary data transmission is carried out using control codes and data codes.

(iv) Disconnection. The devices disconnect, switching to standby or connection verification.

Where there is light traveling in both directions, i.e. transmission and reception, at equal wavelengths, following problems may occur:

(1) In connection verification, the first device may fail to discriminate between incoming and outgoing light. The first device would mistake the light originating in itself for incoming light from the second device, thus starting communication.

(2) Where the second device has suspended communications without a disconnection notice due to a power failure, the first device may receive the light pattern it is transmitting and fail to detect the termination of connection to the second device.

(3) In connection state, the outgoing light from the first device exists together with the incoming light from the second device. The incoming signal may have jitter which does not follow the normal distribution. The jitter would contain a particular deviation. Thus, the CDR (Clock and Data Recovery) circuit, which derives data and clock components from an optical signal, would be required to have a greater jitter tolerance than calculated from the analog waveform of the incoming signal, which could be an additional requirement in circuit design.

Accordingly, in an optical space communications device 1 in accordance with the present embodiment, following control is implemented.

First, a signal detection (SD) signal (reception detection signal) is used. A first device needs to respond to the SD optical signal if it originates in a second device, and does not if it originates in the first device itself. Based on the time in which the first device is transmitting light and the timing of the SD signal, the first device checks the presence of the second device. In addition, the device and the second device have different parameters at that timing.

In this control, the optical space communications device 1 produces a binary signal, or "SD signal," which goes active during signal reception (during transmission of a tone signal and reception of an ordinary data signal). When the optical space communications device 1 is disconnected from the second device (i.e., a transmission failure of the second device either due to a physical disconnection or a turn-off of the power supply), the device 1 can receive no signal from the second device, and the SD signal goes inactive. Thus, disconnection is detected by monitoring the SD signal. In addition, the SD signal is continuously active if the transmission signal is changed from a tone signal to a continuous data communications signal. Based on this SD signal, the receiving end is able to readily detect the start of data communications of the second device. Such an SD signal is employed for the detection of device-device disconnection in the IEEE std 1394b-2003 (IEEE's p1394b standard).

Note that a tone signal for a transmitting end (In other words, an SD signal for a receiving end) is a series of pulses appearing at a relatively short cycle over a certain period of time. For example, a pattern, "01010101," is repeated at about 25 MHz over 2 ms, and the transmission is then suspended for a short while. If the incoming signal varies at a frequency in or above a specified frequency band, an amplifier in the receiving end feeds the SD signal to a control IC. The amplifier disregards light which varies at frequencies below the frequency band so that the receiving end does not mistake incoming disturbing light (for example, originating in a fluoresce lamp) which varies at low frequencies for light transmitted by the second device.

The optical space communications device 1 uses tone signals of two different lengths upon connection. The two kinds of tone signals are assigned "check-another-device" and "start-communications-request." Specifically, for example, short tone signals (for example, 2 ms) are specified for use in checking the second device ("check-another-device), while long tone signals (5 ms or longer) are specified for use in requesting start of communications ("start-communications-request).

Prior to a connection, the optical space communications device 1 exchanges short tone signals. If a certain number of tone signals are successfully exchanged as specified, the device 1 determines that there exists a second device.

After the determination, an optical space communications device 1 (device A) requesting start of communications outputs a long tone signal at an output timing for a next tone signal. Another optical space communications device 1 (device B), having received the long tone signal, determines that it has received a request to start communications from the second device (device A). In this situation, the device B outputs short tone signals straightly if it is not yet ready for communications, whereas it starts the output of continuous signals (data transmitting fast signals) if it is ready for communications. Under these circumstances, the device A which transmitted a long tone signal first checks that the received signal is a continuous signal, not a short tone signal (a longer time SD signal than the short tone signal) before starting output of a continuous signal. Thus, both devices outputs a continuous signal, establishing communications.

In these connection procedures, two states exist: the device A which transmitted a long tone signal first and the device B which received a long tone signal. This fact is used to assign two kinds of parameters in the communications involving the optical space communications device 1.

Secondly, the device and the second device use different idle (standby) codes by means of the parameters assigned according to the above scheme. The idle code transmitted by the first device is the same as the code indicating that the second device disconnects. If the second device disappears, and the first device receives the idle code it is transmitting, the first device regards that it has received a disconnection code and implements a disconnection process. An idle code is a state code indicating absence of data to be transmitted which most likely be output.

Under these circumstances, since the optical space communications device 1 performs full-duplex space communications using light at equal wavelengths, the optical receiver section 12 receives the reflection of the light transmitted from the optical transmitter section 11 in the first device toward the second device off an optical transmission path (hereinafter, the "stray light"), as well as the light transmitted from the optical transmitter section 11 in the second device (hereinafter, "the second device's light). That is, the actually optical receiver section 12 receives superposition of the second device's light and the stray light.

The optical receiver section 12 translates the light received by a light receiving element into a 2-valued electrical signal in accordance with the intensity of the light. The threshold value however cannot be fixed, because the transmission path may vary in length (communications distance L), and the intensity of the second device's light may differ from device to device due to slight irregularities in capability of light emitting elements. Accordingly, the threshold value is made variable with the intensity level of the received light so that the threshold value increases after continued reception of high intensity light and decreases after continued reception of low intensity light.

If the first device stops transmission, that is, if the optical transmitter section 11 stops emission of light, the threshold value in the optical receiver section 12 in the second device decreases. To prevent this from happening, each device is adapted to continuously transmit a signal of some form in connection state. The stray light does not affect the reception of the second device's light since the stray light is less intense than the second device's light, and the threshold value is higher than the intensity level of the stray light while the first device is receiving the second device's light. However, when the second device's light disappears (i.e., disconnection), the threshold value decreases, and the stray light will be received in due time.

Accordingly, the two optical space communications devices 1 use tone signals in establishing a connection to designate one of the devices as a primary and the other as a secondary. Codes are assigned, depending on whether the first device is a primary or a secondary, so that the idle code transmitted during a reception differs from the one transmitted when there is no code to be transmitted and also that both idle codes are never transmitted during an ordinary data transmission.

That enables the optical space communications devices 1 to tell from the codes whether the incoming light is other device's light or stray light. Thus, disconnection is certainly detected.

Thirdly, a constant number of sets of random data are inserted into idle codes at a specified cycle to remove the deviation of jitter. The idle codes constitute state information, information other than data and packets, a signal over a bus in the greatest quantity, and a continuous signal of the same pattern. Therefore, the transmitter circuit 21 is provided with a random number generating section (not shown) generating random codes inserted into the idle codes. In addition, the receiver circuit 23 regards the random data inserted into the idle codes (state information) as an idle code. Idle codes may be inserted at random intervals.

Here, when the optical space communications device 1 is not transmitting data, it is in idle state, transmitting idle codes. Therefore, the optical space communications device 1 transmits idle codes over an extended period of time. In these situations, if the second device has a clock speed close to that of the first device, and both parties continue to transmit a periodical wave, the jitter will develop deviation, degrading jitter tolerance. Jitter tolerance indicates how much jitter a receiving system can tolerate.

To prevent degradation of jitter tolerance, the optical space communications device 1 simultaneously transmits a control code and a random data code to reduce correlation between an outgoing signal and an incoming signal. Conventionally, the same control code was repeatedly transmitted. In other words, the optical space communications device 1 continuously and repeatedly transmits an idle code of the same pattern by inserting another, different pattern (random code).

This enables the signal level of crosstalk caused by idle codes be changed in a random manner by the random codes while the idle codes are continuously being transmitted. The center of the jitter distribution under effect of crosstalk can be prevented from deviating from the natural center of jitter distribution. Therefore, signal transitions and sampling point margins for accurate signal sampling is smaller than margins in conventional cases involving all jitter distributions where the actual distribution leads or lags the natural jitter distribution.

Therefore, by reducing the effect of crosstalk jitter to a minimum level possible, sampling point margins for signal transition are reduced. As a result, a CDR circuit 25 for signal sampling (will be described later) can be manufactured at low cost.

To realize optical space communications at equal wavelengths, the optical space communications device 1 provided with the control terminal 13 and a transmission start signal detector circuit 27 to obtain and detect trigger conditions to switch from standby to connection verification. Optical communications devices working with an optical fiber could check a connection to a second device by detecting the plugging-in of an optical fiber to an optical transmitter/receiver module.

In addition, the optical space communications device 1 includes an arrangement which maintains either a light receiving section and a light transmitting section provided to oppose each other or an optical transmitter/receiver module at such a distance and angle that they can communicate. Optical communications devices working with an optical fiber could communicate if an optical fiber is plugged in an optical transmitter/receiver module.

The optical space communications device 1 is constructed to prevent unwanted external disturbing light from entering, such as natural light and a fluoresce lamp, for less external noise and optically shielded to prevent optical signals from leaking to the outside.

The following will describe the structure and operation of the optical space communications device 1 in detail in reference to FIG. 1.

The optical transmitter section 11 is an LED (light emitting diode), semiconductor laser, or like light source which produces light for transmission in accordance with control signals from the communications control section 20.

The optical receiver section 12 is a semiconductor photo diode, optical detector, or like light receiver which receives incoming light and converts it to electrical signals before feeding the signals to the communications control section 20.

The control terminal 13 feeds the communications control section 20 with a control signal which indicates a start of communications, that is, a transmission start signal to switch from standby to connection verification. For example, the control terminal 13 receives input signals (transmission start signal) from a user through keys or a switch (not shown). Specifically, the control terminal 13 obtains a transmission start signal from outside (trigger obtaining step). The terminal 13 also produces a transmission start signal in accordance with user operation (trigger generating step). When fed with a transmission start signal from the control terminal 13, the transmission start signal detector circuit 27 switches the state machine 26 from standby to connection verification (transmission start signal detection step).

The communications control section 20 is a control IC controlling the communications of the optical space communications device 1. To this end, the communications control section 20 includes a transmitter circuit 21, an S-P (serial to parallel) converter circuit 22, a receiver circuit 23, a P-S (parallel to serial) converter circuit 24, a CDR (clock and data recovery) circuit 25, a state machine (state transition mechanism) 26, and a transmission start signal detector circuit 27.

The transmitter circuit 21 generates electrical signals for data transmission. The transmitter circuit 21 has a different parameter at an SD signal timing depending on whether the circuit 21 is in the first device or the second device. Based on this parameter, the transmitter circuit 21 assigns a different idle code indicating that the first device is not transmitting data depending on whether the circuit 21 is in the first device or the second device. Also, in continuous transmission of idle codes, the transmitter circuit 21 inserts to idle codes a random code having a different random pattern from the pattern of the idle code. The transmitter circuit 21 therefore includes a random number generating section (not shown) generating random codes.

The S-P converter circuit 22 converts electrical signals to outgoing light.

The receiver circuit 23 generates electrical data signals from incoming signals. The receiver circuit 23 generates binary reception detection signals which go active during signal reception. In addition, the receiver circuit 23 regards the random data inserted into idle codes as an idle code. If the receiver circuit 23 receives an idle code that cannot be transmitted from the second device, but that can be transmitted from the first device, the circuit 23 assumes that a disconnection has taken place. Having been notified of that by the receiver circuit 23, the state machine 26 switches from communications to disconnection.

The P-S converter circuit 24 detects incoming light and converts it to electrical signals.

The CDR circuit 25 derives data components and clock components from the optical signals. The CDR circuit 25 is composed of a clock reproducer circuit reproducing (generating) a clock from serial data and a retiming circuit correctly resetting timings for serial data based on the clock reproduced by the clock reproducer circuit for the output of retimed data.

The transmission start signal detector circuit 27 obtains a transmission start signal from the control terminal 13 or the plug detector terminal (trigger obtaining means, trigger generating means) 15 (will be detailed later) notifies the state machine 26.

The state machine 26 controls the transition of communications state of the optical space communications device 1. The state machine 26, upon reception of a transmission start signal from the transmission start signal detector circuit 27, switches the communications state from standby to connection verification, and upon reception of a notice of a detection of disconnection of the second device from the receiver circuit 23, switches the communications state to disconnection. As mentioned earlier, the optical space communications device 1, when standing by, does not transmit any light or detect the second device. Also, in connection verification, the optical space communications device 1 transmits light from the first device to search for the second device, and upon reception of light from the second device, switches to connection.

Under these circumstances, the optical input to the optical receiver section 12 may be the light transmitted from the second device (the second device's light), a reflection of the light transmitted from the first device (stray light), and external disturbing light.

Normally, if the receiver circuit 23 contains DC coupled amplifiers, the slice level is set to an intermediate level between the detected peak and bottom over a certain period. If the amplifiers are AC coupled, the slice level is set to an intermediate electrical potential level of the signal over a certain period. Either way, the optical signal is determined as High or Low with reference to the slice level. The duration of the "constant period" is determined suitably to the CR configuration of the receiver amplifiers.

In connection state, the second device's light is continuously arriving at a certain intensity. Besides, stray light and external disturbing light are arriving. The noise (stray light and external disturbing light) is all added to the second device's light. If the sum signal has smaller jitter than the jitter tolerance of the CDR circuit 25, a logic circuit may regard incoming light as a correct signal for processing.

The acceptable noise level in the incoming light, although variable with the configuration of the receiver circuit 23, is 10 to 20% of the incoming light. At these levels, the noise is within the tolerance, 0.4 to 0.6 UI (Unit Interval), for the CDR circuit 25, and the data is recoverable.

In connection verifying state, there is no incoming signal. The receiver amplifier, either DC coupled or AC coupled, is high in reception sensitivity. In such a stage, if there is an incoming noise signal, the receiver amplifier would respond to it, no matter how weak it is, and switch to connection state despite the fact that there are no other devices. To prevent this from happening, the first device ignores inputs while it is transmitting light and is capable of communications only when information is exchanged with the device at a certain timing.

In addition, the optical space communications device 1 is sufficiently capable of communications at communications distance (device-to-device distance) L up to about 10 cm. Preferably, the distance is 0 to 5 cm for the following reasons.

Optical space communications needs a mechanism which reduces incoming external disturbing light and leaking communications light. An option is to place optical systems in close contact. For example, an optical system capable of up to 100-cm communications will require 250 mW/sir of outgoing light. Although variable with structure of the light emitting element, the power consumption under these conditions is 400 mW or greater. In addition, letting the dynamic range of the receiver amplifier in the optical receiver section 12 be 20 dB, the optical systems must be separated by about 10 cm. In contrast, an optical system capable of up to 5-cm communications will require 1 mW/sir of outgoing light. The power consumption under these conditions is 1 mW or less, about ¼₀₀ times that in the previous case. In addition, a receiver amplifier with an average dynamic range is capable of communications even when the optical systems are in close contact.

In this manner, by limiting the communications distance L to 5 cm or less, close contact communications becomes possible, and power consumption is reduced. In cases where a great communications distance is needed (detailed later), an optical fiber may be plugged to a receptacle 14a on an optical transmitter/receiver module 14 in the optical space communications devices 1a, 1b for communications over optical fiber.

As in the foregoing, the communications control section 20 uses an SD signal to check the presence of a second device based on a time when the first device is transmitting light and an SD signal timing. Thus, the optical space communications device 1 is capable of reducing the light transmitted from the device and external noise to 10 to 20% of the incoming light which was transmitted from the second device. In other words, full-duplex space communications at equal wavelengths can be achieved, with no need for filtering for particular wavelength or optical characteristics and no limitation on the configuration of optical components.

Also, the communications control section 20 uses idle codes to discriminate between other device's light and stray light. A disconnection of the second device is certainly detected. Further, the insertion of random codes reduces effect of crosstalk jitter, which in turn reduces signal transitions and sampling point margins. As a result, a CDR circuit for signal sampling can be manufactured at low cost.

In addition, full-duplex space communications at equal wavelengths can be achieved simply by placing the optical transmitter section 11 and the optical receiver section 12 to face each other.

Therefore, full-duplex space communications at equal wavelengths can be readily achieved.

Now, move on to FIGS. 2, 3. FIG. 2 is a schematic function block diagram showing the arrangement of optical space communications devices 1*a*, 1*b* which is a variation of the optical space communications device 1 in FIG. 1. FIG. 3 is an explanatory drawing showing the optical space communications devices 1*a*, 1*b* during communications.

Referring to FIG. 2, the optical space communications devices 1*a*, 1*b* differ from the optical space communications device 1 only in that the optical transmitter section 11 and the optical receiver section 12 are made into a single optical transmitter/receiver module 14. In other words, the optical transmitter/receiver module 14 integrates the aforementioned functions of both the optical transmitter section 11 and the optical receiver section 12. The optical space communications devices 1*a*, 1*b* may differ in external appearance, but share common functions.

In addition, as shown in FIG. 3, the optical space communications devices 1*a*, 1*b* are structured so that they are connectable with the openings of the receptacles 14*a* straightly facing each other. On the bottom of each receptacle 14*a* are there provided a light emitting element and a light receiving element for the optical transmitter/receiver module 14. With the optical space communications devices 1*a*, 1*b* connected together, the optical transmitter/receiver modules 14 face each other, permitting no external light into the inside and communications light to the outside. The external shapes of the optical space communications devices 1*a*, 1*b* in FIG. 3 are mere examples and not limiting.

This structure of the optical space communications devices 1*a*, 1*b*, in optical communications, prevents entry of foreign objects, disagreement of optical axes, and communications distance in excess of communicable distance, which otherwise could disrupt communications. The structure also allows no external light to come inside; communications is stable and relatively error free. With no communications light leaking out, it is ensured that communications light does not do any harm to people, especially, to the human eye (eye safety). In addition, the user needs no adjustment of optical axes for communications.

When the incoming light comes to contain errors in excess of a certain level as the optical space communications devices 1*a*, 1*b* are increasingly separated, the communications control section 20 automatically switches to connection verification mode in which light is transmitted for, for example, only ⅟₁₂₈ of the period. This is intended primarily to secure eye safety, and secondarily to prevent information leak through eavesdropping and propagation of errors to other devices.

As mentioned earlier, the light emitting element and the light receiving element for the optical transmitter/receiver module 14 are provided on the bottom of the receptacle 14*a*.

The optical space communications devices 1*a*, 1*b* are capable of optical communications over a single optical fiber, by inserting the optical fiber to the receptacle 14*a*. In other words, the optical transmitter/receiver module 14 functions as a single-fiber optical module capable of full-duplex bidirectional communications over a single fiber.

Here, the optical space communications device 1 contains the control terminal 13 and the optical transmitter/receiver module 14 at different locations (so do optical space communications devices 1*a*, 1*b*). The control terminal 13 is fed with a transmission start signal which determines whether to issue a communications request. In accordance with the transmission start signal, the state machine 26 is controlled to perform optical communications if a communications request has been made and not to perform optical communications if a communications request has not been made. In this manner, the ON/OFF of the optical communications can be controlled remotely from the optical transmitter/receiver module.

A cradle may supply a transmission start signal to the control terminals 13 of the two optical space communications devices 1, 1 so that optical communications can be automatically performed when the optical transmitter section 11 and the optical receiver section 12 are mounted to the cradle facing each other. Alternatively, if the optical space communications devices 1*a*, 1*b* are fit together as shown in FIG. 3, one of the devices to which is supplied a transmission start signal may, in response to, for example, button manipulation, transfer the signal to the control terminal 13 in the other device through, for example, a cable.

The optical space communications devices 1*a*, 1*b* may have a plug detector terminal 15 in the receptacle 14*a* in which is provided the optical transmitter/receiver module 14, so that optical communications can be performed when the plug detector terminal 15 detects an optical fiber plugged into the receptacle 14*a*. This enables a single optical transmitter/receiver module 14 to perform space communications and optical fiber communications.

When there is no connection start or communications request signal from the control terminal 13, the optical space communications device 1 may power off the optical transmitter/receiver module 14, switching to a mode where the communications control IC (communications control section 20) does not operate either (standby mode). As there is an incoming connection start signal, the optical transmitter/receiver module 14 would be powered on, and the communications control IC would switch to connection verification. Power consumption is thus reduced while no communications take place.

A transmission start signal may be supplied via the control terminal 13 when the optical space communications devices 1*a*, 1*b* are combined, whereas a control signal is supplied so that no communications may take place when the devices 1*a*, 1*b* are taken apart. Thus, the devices operate only when they are combined, which reduces power consumption. Similarly, the devices may be adapted to operate only when the plug detector terminal 15 detects an insertion of an optical fiber.

In addition, the receptacle 14*a* may be provided in the form of a multifunctional terminal which also acts as an audio input/output terminal (e.g., headphone output terminal) or like analog terminal. In that case, the plug detector terminal 15 provided in the receptacle 14*a* would detect an analog plug so as to allow analog signal transmission/reception when an analog plug is inserted. In this manner, the optical space communications devices 1*a*, 1*b* could switch between operations in accordance with the type of the cable inserted in the receptacle 14a. Hence, a single device provides various analog input/output functions including optical space communications, optical fiber communications, and headphone. This is convenient to reductions in volume of the device.

As in the foregoing, the optical space communications device 1 (and optical space communications devices 1a, 1b) readily performs full-duplex space communications at equal wavelengths as follows. That is, in communications, light sources can use the same wavelength. In addition, when devices are oppositely placed, no strict angle settings are required; the devices can be oppositely placed with convenient latitude. In addition, effects of stray light (return light) are lowered by a logic circuit merely carrying out an operation on binarized data in accordance with incoming light intensity; thus, the structure of the analog circuit in the optical receiver section can be made simple, contributing to reductions in the price of the optical system.

The present embodiment is not intended to limit the scope of the present invention in any form, and variable within the scope of the present invention. Examples such variations follow.

The present invention is an optical space transmission system using LED or LD as a light source. A control IC may be one designed to control full-duplex bidirectional communications over a single optical fiber at the same wavelengths.

In addition, the optical space transmission system may use an optical transmitter/receiver module designed for communications over a single optical fiber as at least one of optical transmitter/receiver modules.

In addition, the optical space transmission system may have its communicable distance set between 0 cm and 5 cm.

In addition, the optical space transmission system may include a light leakage prevention mechanism preventing communications light from leaking to the outside when two optical space communications devices are carrying out data communications or in data communications preparation state. This eliminates negative effects of communications light on humans in data communications or data communications preparation state. Especially, negative effects on the eye are eliminated. Eye safety is ensured. In addition, information leakage is prevented.

In addition, the optical space transmission system may be such that two optical space communications devices include an external light blocking mechanism blocking communications space from external light. This leaves only light from two optical transmitter/receiver modules in the communications space. No external disturbing light causes communications errors. Stable full-duplex optical communications is performed.

In addition, the optical space transmission system is such that optical transmitter/receiver modules are oppositely placed at communicable angle and distance when two optical space communications devices are oppositely placed using the light leakage prevention mechanism or the external light blocking mechanism. This enables optical communications simply by oppositely placing optical space communications devices using the light leakage prevention mechanism or the external light blocking mechanism, without paying attention to the position of the optical transmitter/receiver modules.

In addition, the optical space transmission system may switch from data communications state or data communications preparation state to connection verifying state when the optical transmitter/receiver modules have received external light equal to, or in excess of, a certain value. In cases where incoming external disturbing light causes such frequent communications errors that satisfactory communications quality is not guaranteed, this shields communications paths and prevents error-caused abnormal operation of connected devices.

In addition, the optical space transmission system may be adapted to include external control terminals controlling whether to make a communications request somewhere other than in the optical transmitter/receiver modules so as to perform optical communications in response to a communications request and not to perform optical communications in the absence of communications request. This enables the ON/OFF control of optical communications remotely from the optical transmitter/receiver modules.

In addition, the optical space transmission system may be adapted so that the external control terminal makes a communications request when two optical space transmission devices are oppositely placed using the light leakage prevention mechanism or the external light blocking mechanism and does not make a communications request when the two optical space transmission devices are removed from the mechanism. This enables automatically optical communications when two optical space communications devices are oppositely placed using the light leakage prevention mechanism or the external light blocking mechanism.

In addition, the optical space transmission system may turn off the power supply to the optical transmitter/receiver modules, switching the communications control IC to non-operation mode, when there is no connection start or communications request signal from the external control terminals, and turn on the power supply to the optical transmitter/receiver modules, switching the communications control IC to connection verifying state, when there is an incoming connection start signal. This reduces power consumption when no communications are performed.

In addition, the optical space transmission system may include an optical fiber detecting terminal on the optical transmitter/receiver modules, as well as the external control terminals, to perform optical communications when the external control terminals has made a communications request or the optical fiber detecting terminal has detected insertion of an optical fiber. This enables the one optical transmitter/receiver modules to perform space communications and fiber communications.

In addition, the optical space transmission system may turn off the power supply to the optical transmitter/receiver module, switching the communications control IC to non-operation mode, when there is no communications request from the external control terminal and the optical fiber detecting terminal does not detect insertion of an optical fiber, and turn on the power supply to the optical transmitter/receiver module, switching the communications control IC to connection verifying state, when there is an incoming connection start signal. This reduces power consumption when there is no need for communications.

In addition, the optical space transmission system may be adapted so that the optical transmitter/receiver modules have an analog plug detecting function and when an analog plug is inserted, becomes capable of analog signal transmission. This provides a communications device with a single module offering an analog output terminal for single fiber communications, optical space communications, headphone output, etc.

In addition, the optical space transmission system may be adapted so that the optical transmitter/receiver modules have an analog plug detecting function and when an analog plug is inserted, becomes capable of analog signal reception. This provides a communications device with a single module offering an analog input terminal for single fiber communications, optical space communications, audio input, etc.

In addition, the optical space transmission system is applicable to any device performing device-to-device data communications.

As in the foregoing, an optical space communications device in accordance with embodiments of the present invention is an optical space communications device for full-duplex optical space communications with light at equal wavelengths and arranged to include a transmitter circuit which assigns an idle code indicating that the device is transmitting no data so that the idle code differs from an idle code for another device and which, when the transmitter circuit continuously transmits such idle codes, inserts, between the idle codes, a random code having a different random pattern from a pattern of the idle codes.

A method of controlling an optical space communications device in accordance with embodiments of the present invention is a method of controlling an optical space communications device for full-duplex optical space communications with light at equal wavelengths and arranged to include: assigning an idle code indicating that the device is transmitting no data so that the idle code differs from an idle code for another device; and when continuously transmitting such idle codes, inserting, between the idle codes, a random code having a different random pattern from a pattern of the idle codes.

According to the arrangement and method, the idle codes differ from one device to another, making it possible to distinguish another device's light from stray light. A disconnection of the other device is reliably detected. For example, when the device has received a code which the other device never transmits, the device regards the code as indicating that the other device has disconnected and carries out a disconnection if the code is an idle code the device may transmit.

In addition, the insertion of a random code reduces effect from crosstalk jitter even when idle codes are continuously transmitted. Therefore, signal transitions and sampling point margins are reduced. As a result, CDR circuits for signal sampling can be manufactured at low cost.

Hence, the optical space communications device performs full-duplex space communications with light at equal wavelengths in simple form.

Further, an optical space communications device in accordance with embodiments of the present invention is preferably arranged to further include a receiver circuit generating a binary reception detection signal which becomes active during a signal reception, wherein the transmitter circuit has different parameters for the device and the other device at a timing of the reception detection signal, and based on the parameters, assigns different idle codes to the device and the other device.

Further, a method of controlling an optical space communications device in accordance with embodiments of the present invention is preferably arranged so that a different idle code is assigned to the device and the other device based on different parameters for the device and the other device at a timing of a binary reception detection, signal which becomes active during a signal reception.

According to the arrangement and method, further, based on different parameters for the device and the other device at a timing of a reception detection signal (SD signal), a different idle code is assigned for the device and the other device. To assign different parameters, for example, use "other-device-check" when connecting and tone signals having two different lengths for a "communications-start request," provide parameter a to device A which is the first to send a "communications-start request" tone signal, and provide parameter b to device B receiving the tone signal.

Further, an optical space communications device in accordance with embodiments of the present invention is preferably arranged to include trigger obtaining means obtaining a transmission start signal from outside; and a transmission start signal detector circuit, when supplied with the transmission start signal from the trigger obtaining means, switching the device from a standby state to a connection verifying state.

Further, a method of controlling an optical space communications device in accordance with the present invention is preferably arranged to include the trigger obtaining step of obtaining a transmission start signal from outside; and the transmission start signal detection step of switching the device from a standby state to a connection verifying state in accordance with the transmission start signal.

According to the arrangement and method, further, when a transmission start signal is fed from outside, the device is switched from a standby state to a connection verifying state. Therefore, in space communications, a trigger is supplied to check connection with other devices. In standby state, the optical space communications device neither transmits light or detect other devices. In connection verifying state, the optical space communications device causes the device to transmit light to search for other devices, and switches to connection state when the device has received light from another device.

Further, an optical space communications device in accordance with embodiments of the present invention is preferably arranged to include: trigger generating means generating a transmission start signal in accordance with a user manipulation; and a transmission start signal detector circuit, when supplied with the transmission start signal from the trigger generating means, switching the device from a standby state. to a connection verifying state.

Further, a method of controlling an optical space communications device in accordance with embodiments of the present invention is preferably arranged to include the trigger generating step of generating a transmission start signal in accordance with a user manipulation; and the transmission start signal detection step of switching the device from a standby state to a connection verifying state in accordance with the transmission start signal.

According to the arrangement and method, further, when, for example, a user enters a communications start command, the device is switched from a standby state to a connection verifying state. Therefore, in space communications, a trigger is supplied to check connection with other devices.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A device, comprising:
   a first transmitter/receiver unit, the first transmitter/receiver unit capable of communicating at the same wavelength with a second transmitter/receiver unit using an optical wireless full duplex connection;
   a transmission circuit,
      wherein the transmission circuit assigns an idle code to be transmitted by the first transmitter/receiver unit, when the device is idle,
      wherein the idle code is different from any other idle code being received by the device from any other device, and
      wherein when the transmission circuit assigns an idle code to be transmitted continuously by the transmitter/receiver unit, the transmission circuit replaces part of the transmission of the idle code with random pattern codes, wherein the random pattern codes are different from idle codes begin transmitted or received by the transmitter/receiver unit.

2. The device as set forth in claim 1, further comprising a receiver circuit generating a binary reception detection signal which becomes active during a signal reception,
wherein the transmitter circuit has different parameters for said device and the other device at a timing of the reception detection signal, and based on the parameters, assigns different idle codes to said device and the other device.

3. The device as set forth in claim 1, further comprising:
trigger obtaining means obtaining a transmission start signal from outside, and
a transmission start signal detector circuit, when supplied with the transmission start signal from the trigger obtaining means, switching said device from a standby state to a connection verifying state.

4. The device as set forth in claim 1, further comprising:
trigger generating means generating a transmission start signal in accordance with a user manipulation; and
a transmission start signal detector circuit, when supplied with the transmission start signal from the trigger generating means, switching said device from a standby state to a connection verifying state.

5. The device as set forth in claim 1, wherein said device has a communications distance of 0 cm to 5 cm.

6. The device as set forth in claim 1, further comprising a light leakage prevention mechanism preventing communications light from leaking outside during data communications and a data communications preparation state.

7. The device as set forth in claim 1, further comprising an optical transmitter/receiver module functioning as an optical module, for use with a single optical fiber, performing full-duplex bidirectional communications over a single optical fiber.

8. The device as set forth in claim 1, further comprising a receptacle into which a plug is inserted,
wherein said device switches in operation in accordance with a type of cable inserted in the receptacle.

9. A method of controlling a device that communicates using an optical wireless full duplex connection using the same wavelength at the transmitter and receiver, comprising:
assigning an idle code to be transmitted by a transmitter/receiver unit when the device is idle, wherein the idle code is different from any other idle code being received from any other device; and
replacing part of the idle code being transmitted by the transmitter/receiver unit with random pattern codes when the idle code is to be transmitter continuously, wherein the random pattern codes are different from idle codes being transmitted or received by the transmitter/receiver unit.

10. The method as set forth in claim 9, wherein a different idle code is assigned to said device and the other device based on different parameters for said device and the other device at a timing of a binary reception detection signal which becomes active during a signal reception.

11. The method as set forth in claim 9, comprising:
a trigger obtaining step of obtaining a transmission start signal from outside;
and
a transmission start signal detection step of switching said device from a standby state to a connection verifying state in accordance with the transmission start signal.

12. The method as set forth in claim 9, comprising:
a trigger generating step of generating a transmission start signal in accordance with a user manipulation; and
a transmission start signal detection step of switching said device from a standby state to a connection verifying state in accordance with the transmission start signal.

13. A method of optical wireless full duplex connection communication between a first device and a second device using same wavelength at the transmitter and receiver comprising the steps of:
assigning a first idle code to a first device that communicates using an optical wireless full duplex connection using the same wavelength at the transmitter and receiver,
transmitting the first idle code when the first device is idle, wherein the first idle code is different from any other idle code being received from any other device; and
assigning a second idle code to a second device that communicates using an optical wireless full duplex connection using the same wavelength at the transmitter and receiver,
transmitting the second idle code when the second device is idle, wherein the second idle code is different from any other idle code being received from any other device;
when transmitting the first idle code continuously, replacing part of the first idle code with random pattern codes, wherein the random pattern codes are different from any other idle codes being transmitted or received by the device.

14. The method of claim 13 wherein said step of assigning a second idle code different from the first idle code to the second device indicating that the second device is transmitting no data comprises the additional step of assigning the second idle code after a binary reception detection signal is generated by the second device.

15. The method of claim 13 wherein said step of assigning a second idle code different from the first idle code to the second device indicating that the second device is transmitting no data comprises the additional step of assigning the second idle code based on a parameter of the second device that differs from a parameter of the first device.

16. The method of claim 13 including the additional steps of:
generating a transmission start signal; and
switching the first device from a standby state to a connection verifying state upon receipt of the transmission start signal.

17. The method of claim 13 including the additional steps of:
generating a transmission start signal in response to a user input, and
switching the first device from a standby state to a connection verifying state upon receipt of the transmission start signal.

18. The device as set forth in claim 1 wherein the idle code transmitted by the device is the same as a code indicating that another device disconnects.

19. The method as set forth in claim 9 wherein the idle code transmitted by the device is the same as a code indicating that another device disconnects.

20. The method as set forth in claim 13 wherein the first idle code transmitted by the first device is the same as a code indicating that the second device disconnects.

* * * * *